G. S. DRAKE.
Potato-Diggers.
No. 149,730.                Patented April 14, 1874.
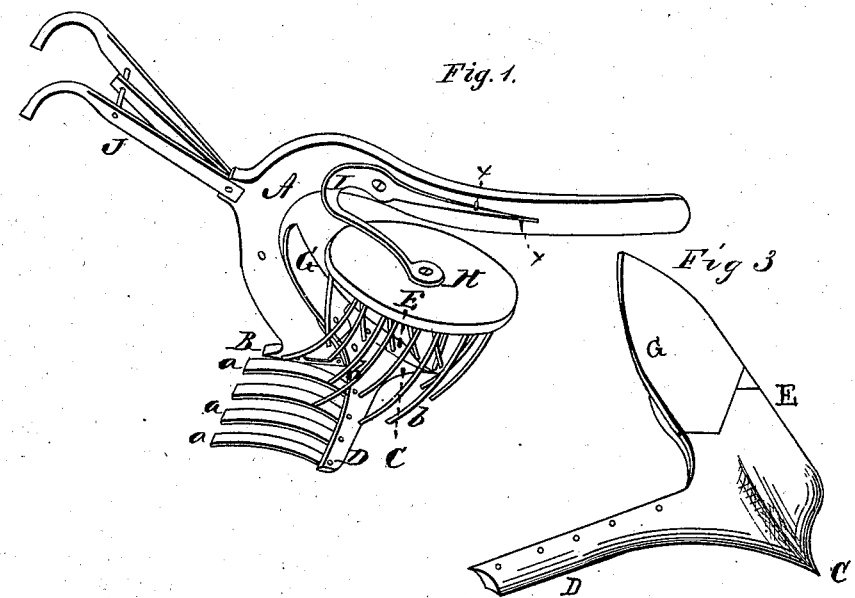
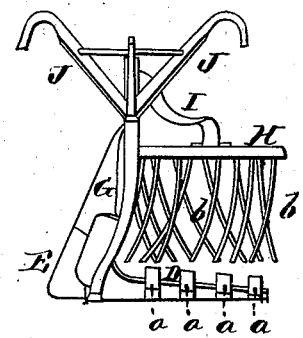

UNITED STATES PATENT OFFICE.

GEORGE S. DRAKE, OF EASTON, NEW YORK.

IMPROVEMENT IN POTATO-DIGGERS.

Specification forming part of Letters Patent No. 149,730, dated April 14, 1874; application filed January 20, 1874.

*To all whom it may concern:*

Be it known that I, GEORGE S. DRAKE, of Easton, in the county of Washington and in the State of New York, have invented certain new and useful Improvements in Potato-Diggers; and do hereby declare that the following is a full, clear, and exact description thereof, reference being had to the accompanying drawings and to the letters of reference marked thereon, making a part of this specification.

The nature of my invention consists in the construction and arrangement of a potato-digger, as will be hereinafter more fully set forth.

In the accompanying drawing, Figure 1 is a perspective view, and Fig. 2 a rear elevation, of my potato-digger. Fig. 3 is a front perspective view of the plow.

A represents the plow-beam curved downward and forward, and the rear or lower end provided with a curve or crook outward to the left, as shown in Fig. 2. To the lower edge of the beam A is attached a shoe, B, to run in the bottom of the furrow made by the plow-point. C represents the plow-point attached to the front edge at the lower end of the beam A, and formed with an inclined projecting cutting-arm, D, on the right or mold-board side. On the left or land side it is formed with a cutting-wing, E, the upper part of which is curved over toward the mold-board side. G represents a narrow mold-board, forming a continuation of the point C and wing E. This mold-board is attached to the beam A, and is curved to form a continuous curve with the wing E, the extreme upper end of the mold-board being set almost edgewise.

By this construction, when the machine is in operation the point C passes below the center of the ridge, and all the potatoes dug up by the same are thrown over to the right of the machine.

From the upper rear edge of the arm D extend a series of curved flat arms or bars, $a\ a$, forming a grating, over which the potatoes are carried by the separator to be cleaned by said separator from all adhering dirt. The separator consists of a disk, H, provided with a number of curved wire teeth, $b\ b$. The disk H is pivoted in an inclined position to a spring-arm, I, which is bent as shown in Fig. 1, and pivoted to the side of the plow-beam A, and its front end twisted and held between pins $x\ x$ on the side of the beam. The separator is revolved by its front teeth coming in contact with the ground, and as it revolves it carries the potatoes, as they are thrown over onto the grating $a$, up along said grating, and clears them of the adhering dirt, leaving them on top of the ground, to be afterward picked up. By the outward crook or bend in the lower portion of the beam A, the machine is more evenly balanced and the draft equalized. J J represent the handles, attached in any suitable manner to the rear part of the plow-beam A.

Having thus fully described my invention, what I claim as new, and desire to secure by Letters Patent, is—

1. The combination of the plow-point C, arm D, wing E, mold-board G, and grating $a$, all constructed substantially as and for the purposes herein set forth.

2. The revolving disk H, provided with curved wire teeth $b\ b$, and attached, by the spring-arm I, to the plow-beam A, substantially as and for the purposes herein set forth.

In testimony that I claim the foregoing I have hereunto set my hand this 1st day of December, 1873.

GEORGE S. DRAKE.

Witnesses:
NATHANIEL B. WELLING,
DAVID F. BAKER.